(12) United States Patent
Smith

(10) Patent No.: US 7,359,070 B1
(45) Date of Patent: Apr. 15, 2008

(54) MULTI-FUNCTION PERIPHERAL WITH CAMERA

(75) Inventor: Dana Smith, Dana Point, CA (US)

(73) Assignee: Sharp Laboratories of America, Incorporated, Camas, WA (US)

( * ) Notice: Subject to any disclaimer, the term of this patent is extended or adjusted under 35 U.S.C. 154(b) by 0 days.

(21) Appl. No.: 09/407,171

(22) Filed: Sep. 30, 1999

(51) Int. Cl.
*G06K 1/00* (2006.01)
*G06K 15/00* (2006.01)
*H04N 1/00* (2006.01)

(52) U.S. Cl. .................. 358/1.13; 358/1.18; 358/401; 358/434

(58) Field of Classification Search .............. 358/474, 358/497, 496, 448, 450, 1.18, 443, 1.15, 358/462, 451, 452, 1.13, 401, 434; 382/279, 382/312; 348/586, 587, 590, 169; 345/441; 396/428; 355/202
See application file for complete search history.

(56) References Cited

U.S. PATENT DOCUMENTS

| | | | |
|---|---|---|---|
| 4,262,301 A | | 4/1981 | Erlichman |
| 4,588,282 A | * | 5/1986 | Levine ........................ 358/473 |
| 4,644,391 A | | 2/1987 | Shibuya et al. |
| 4,843,426 A | * | 6/1989 | Levine ........................ 399/184 |
| 4,937,676 A | | 6/1990 | Finelli et al. |
| 4,941,057 A | * | 7/1990 | Lehmbeck et al. ......... 358/443 |
| 4,998,132 A | * | 3/1991 | Kurogane et al. ............ 355/40 |
| 5,073,868 A | | 12/1991 | Tada |
| 5,125,072 A | * | 6/1992 | Ng .............................. 358/1.13 |
| 5,184,160 A | * | 2/1993 | Massarsky .................. 396/428 |
| 5,218,403 A | * | 6/1993 | Smith .......................... 355/39 |
| 5,371,536 A | * | 12/1994 | Yamaguchi ................. 348/169 |
| 5,615,324 A | * | 3/1997 | Kuboyama .................. 345/441 |
| 5,638,186 A | | 6/1997 | Motoyama |
| 5,815,645 A | * | 9/1998 | Fredlund et al. ........... 358/1.18 |
| 5,831,747 A | | 11/1998 | Salgado |
| 5,864,640 A | * | 1/1999 | Miramonti et al. ......... 382/312 |
| 5,867,282 A | | 2/1999 | Fredlund et al. |
| 5,937,104 A | * | 8/1999 | Henderson et al. ......... 382/279 |
| 6,034,785 A | * | 3/2000 | Itoh .......................... 358/1.18 |
| 6,081,613 A | * | 6/2000 | Ikurumi et al. ............. 382/147 |
| 6,104,497 A | * | 8/2000 | Cohen et al. ............... 358/1.13 |
| 6,181,379 B1 | * | 1/2001 | Kingetsu et al. ............ 348/364 |
| 6,426,800 B1 | * | 7/2002 | Mizuno et al. ............. 358/1.15 |
| 6,799,297 B2 | * | 9/2004 | Ackaret ...................... 715/505 |
| 6,980,302 B2 | * | 12/2005 | Knighton et al. ........... 356/607 |
| 2003/0175024 A1 | * | 9/2003 | Miyoshi et al. ............. 396/154 |
| 2004/0202364 A1 | * | 10/2004 | Otani et al. ................. 382/154 |

* cited by examiner

*Primary Examiner*—Houshang Safaipour
(74) *Attorney, Agent, or Firm*—Michael Blaine Brooks, PC; Michael B. Brooks; David Ripma

(57) ABSTRACT

A multi-function peripheral device for producing output images. The device includes a scanning system for creating a scanned input image, a camera for creating a captured input image, a controller for receiving at least one of said scanned input image and said captured input image, and a printing system for producing an output image rendered by said controller.

20 Claims, 2 Drawing Sheets

MULTI-FUNCTION PERIPHERAL WITH CAMERA

BACKGROUND OF THE INVENTION

1. Field of the Invention

This invention relates to imaging systems, more particularly for imaging systems that have several options for input images.

2. Background of the Invention

Multi-function peripherals (MFP) in the imaging area typically include several different types of devices that manipulate image data. A typical MFP includes a scanning system and a printing system. The MFP can be used as a scanner only, producing electronic files from scanned objects such as documents or images. It can function as a copier, where the scanning system scans the object and then uses the printing system to produce copies of that image. It can also have other types of devices attached, such as a network link or a phone line for facsimile reception and transmission. The MFP can also function as a printer, where the scanning system is bypassed and only the printing system is used.

There are several embodiments of these types of systems exemplified by the prior art. In some embodiments, multiple input devices are connected dynamically to several different options for output devices. These types of systems typically involve some type of server or controller that connects the selected input device or devices to the selected output device or devices. Examples of these types of systems can be found in U.S. Pat. No. 5,867,282, issued Feb. 2, 1999; and U.S. Pat. No. 5,073,868, issued Dec. 17, 1991.

Other examples of these devices include those that can merge the input images from different inputs to create a composite image for output. For example, U.S. Pat. No. 4,644,391, issued Feb. 17, 1987, describes a system in which supplemental information can be written on the platen of a copier. The system then manipulates the scanned image data to 'write' the supplemental information written on the platen over the scanned image data to produce an annotated image.

Another example of merging inputs from a scanning system is shown in U.S. Pat. No. 5,831,747, issued Nov. 3, 1998. In this system, the input image is manipulated for insertion into a predefined frame or border. User input from a user interface selects the frame or border. In this manner, the system merges the two different images into one output image.

Other applications of combined images are shown in U.S. Pat. No. 5,638,186, issued Jun. 10, 1997. In this system, the input device such as a scanner, a network link for receiving data, or a fax machine can route data to one of several output devices, such as a printer, a computer or a fax machine. The data from more than one of the input devices can be merged prior to output, creating a composite document for output.

Other manipulations of the data can be achieved other than merging the data from several input sources. U.S. Pat. No. 4,843,426, issued Jun. 27, 1989, shows a system that performs special effects on documents to be produced. The special effects include modifying a portion or portions of an input image with different colors, outlines, etc. One special effect is the rendering of two-dimensional representations of a three-dimensional object. The three-dimensional object data is created by a portable video camera being used as a reader to create the three-dimensional data.

Other applications using cameras exist in the prior art. The use of standard cameras, for example, is discussed in U.S. Pat. No. 4,262,301, issued Apr. 14, 1981. The input image from the camera is then printed by a printer instead of written onto film. U.S. Pat. No. 5,218,403, issued Jun. 8, 1993, shows another method for obtaining an image from a camera. The system described shows a background and platform for mounting objects to be captured with a camera. U.S. Pat. No. 4,937,676 shows a printing system specifically designed to attach to a camera. The camera captures the image and the printer, when attached to the camera, is used to produce the image.

However, none of these examples takes advantage of the digital capabilities of a multi-function peripheral, nor do they contemplate the use of digital cameras in combination with copiers or other types of image production devices. Therefore, a need exists for a camera to be attached to an MFP.

SUMMARY OF THE INVENTION

One aspect of the invention is a multi-function peripheral device for producing output images. The system includes a scanning system for creating a scanned input image, a camera for creating a captured input image, a controller for receiving at least one of said scanned input image and said captured input image, and a printing system for producing an output image rendered by said controller. The controller can take input from both the scanner and the camera, or from one of the two. The user can use previously stored images, created by the user or not, to merge with input from either the scanner the camera or both.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1A:
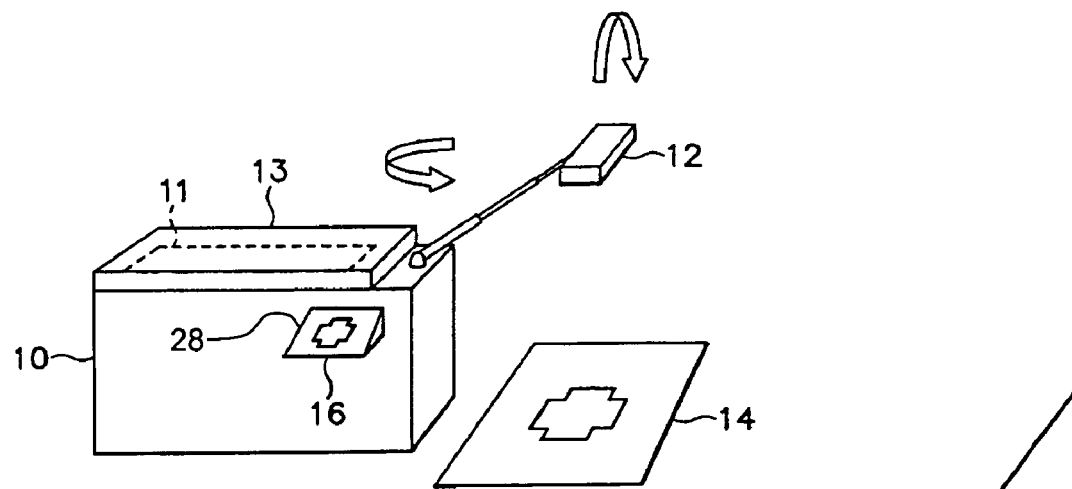
FIGS. 1*a-b* show embodiments of a multi-function peripheral including a camera in accordance with the invention.
Figure 1B:
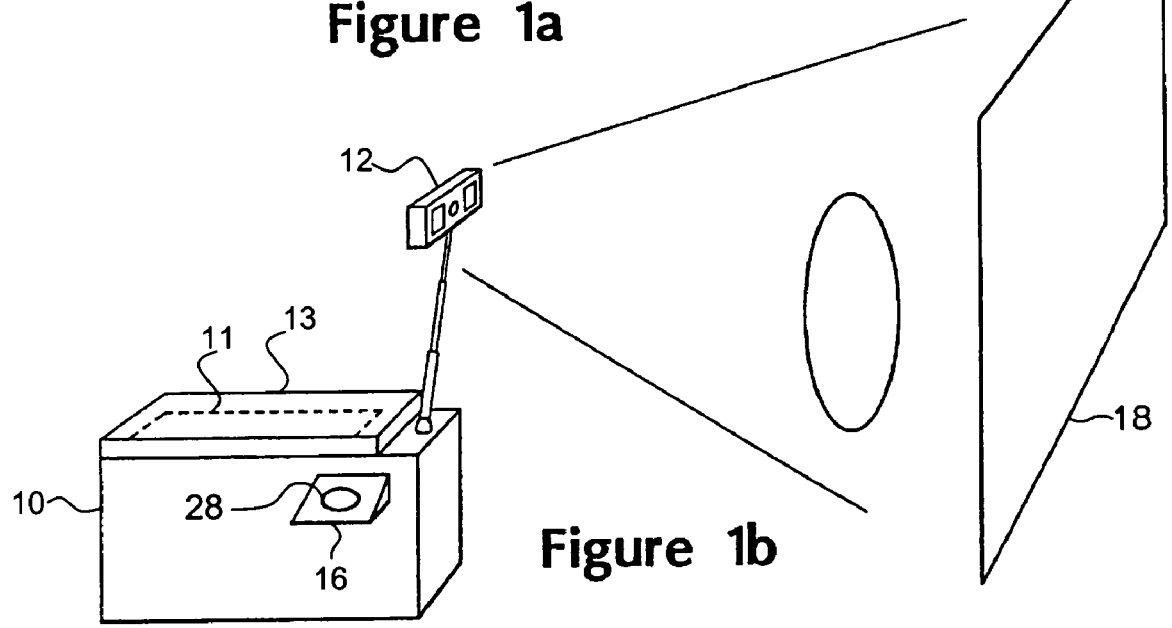

FIGS. 1*a* and 1*b* show embodiments of a multi-function peripheral that includes a camera. The multi-function peripheral 10, shown in FIG. 1, could include any number of functions. At a minimum, however, it must include a scanning system, a printing system, a camera and a controller. The scanning system could be used as part of a copier or fax machine, as examples. The print system could be used as part of a copier, a fax machine, or a network printer, as examples. The camera could be any type of camera used to generate electronic images of objects placed in its field of view.

However, for purposes of this discussion, the multi-function peripheral will be assumed to be a copier with a camera attached. The MFP 10 includes a control panel 16, which may or may not include a preview panel 28 of the image to be produced by the printing system. The MFP also has an imaging platen 11 for typical document copying applications and an imaging platen cover 13. The camera 12 has adjustable positioning capabilities that allow it to capture images from several different positions.

One such position is shown in FIG. 1a. In this position, the object to be imaged 14 is placed next to the MFP chassis and the camera is positioned to acquire the image from a direct overhead position. This position has several advantages, especially for large documents or awkwardly shaped objects that would otherwise be image-able from the imaging platen. Examples of these types of objects include large schematic or engineering drawings, and framed photographs or art work.

At the present time, it is envisioned that the imaging resolution of the camera will be low to medium resolution, while the imaging resolution of the scanning system will be much higher. However, there is no limitation to the resolution of either system. The selection of the resolutions is left to the system design and will typically include considerations such as cost, intended use of the system and availability of parts.

Another application of the camera is to take images of people or large objects that can be positioned next to the MFP, as shown in FIG. 1b. An optional backdrop or screen 18 could be used behind the subject to be captured by the camera. Any blank wall can be substituted for the backdrop or screen. However, the use of backdrops or screens allows users to select a pleasant background scene in front of which they can stand for their picture or a background more reliably processed for replacement with image information previously captured by camera or scanner.

Figure 2:
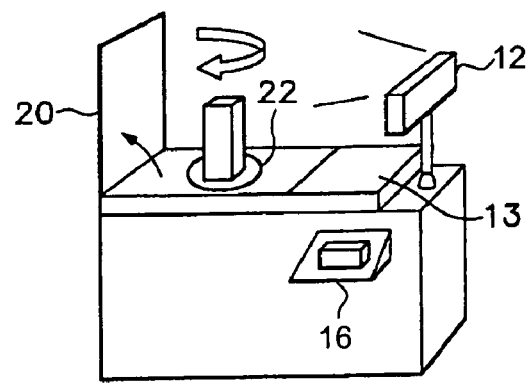
FIG. 2 shows an alternate embodiment of a multi-function peripheral including a camera in accordance with the invention.

Other embodiments of the location and accessories used for capturing images from the camera are possible. An alternate embodiment is shown in FIG. 2. In this example, the top of the platen cover 13 includes a rotating table 22. A pull-up or pop-up background 20 for the rotating table 22 can be used to limit the field of view of the camera. Combinations of these figures are also possible, as well as the positioning of the rotating table 22 as part of the platen cover 13, or not. The MFP is envisioned to allow the user to capture images from the camera in many different ways, the above examples of which are not intended to limit the applicability of the invention.

The images captured by the camera will be referred to as captured images, even though any image that is acquired could be referred to as captured. However, to differentiate between the images acquired from the camera and the images acquired from the platen, captured images will refer only to those from the camera. Images acquired from the imaging platen 11 of FIG. 1a will be referred to as scanned images.

Figure 3:
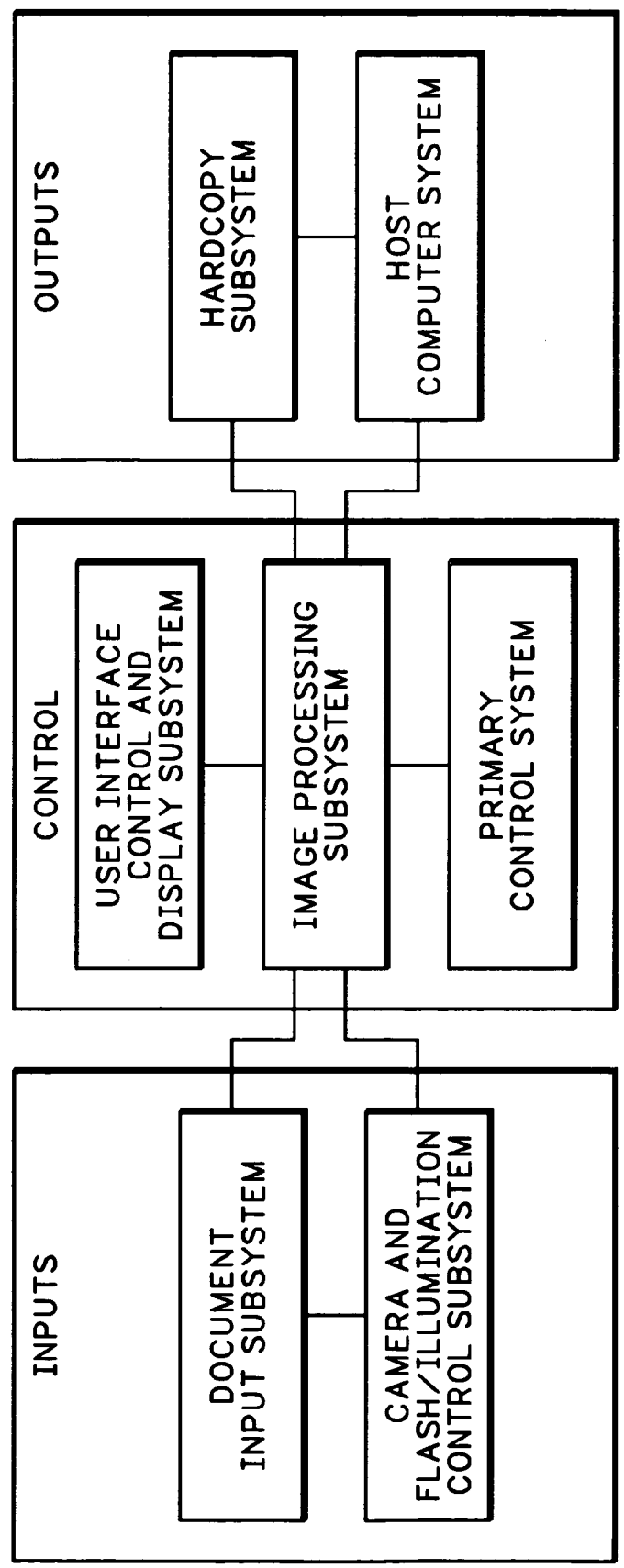
FIG. 3 shows a schematic representation of a controller for a multi-function peripheral including a camera, in accordance with the invention.

The MFP will allow users to combine the images from the camera and the platen by inputs from the user interface 28 from FIG. 1a. One embodiment of a controller that allows this merging of images is shown in FIG. 3. The controller is the middle component of the MFP. The first component is the input system. The input system includes inputs from the document input system, the imaging platen, and the camera system. The output system is the third component of the system and supplies the ability to produce hard copy output, as well as file output for disks. Note that the system refers to a host computer, but that the host computer could be nothing more than a microcontroller or processor with associated memory.

The controller receives input from at least one of the two options for input images and then processes them according to the user inputs. This processing could be merely making copies of documents scanned from the platen, hard copy or copies of images captured by the camera, or merged documents that include images from both the platen and the camera. This information is then sent to the printing system, which produces the final image for the user.

The merging of the two images could be accomplished in several ways. For example, a document containing a border and decorative background might include a region of a specific color or shade of gray. The user could then photograph himself or herself and the image processing would substitute the image of the user into that region of a specific color or shade of gray.

The controller may merge several images from one source as well. For example, a 360-degree view of the object could be obtained using the rotating table 22 of FIG. 2. The image processing system and host computer could then manipulate the data to produce two-dimensional representations of this view for rendering by the printing system.

In addition to merging inputs from either the scanner or the camera, the MFP could also use pre-stored inputs in combination with one or both. For example, a selection of previously stored backgrounds could be presented to the user from a user interface. The user then selects the background to be merged with the user's input, either from the camera, the scanner or both. There is no limitation to the number of previously stored images used in creating one output document. There is also no restriction on whether the previously stored image or images are combined with scanned input or captured input or both. The user could select from images stored from the user's own inputs, or from a set shipped with the MFP.

It must be noted that the printing system does not have to be separate from the control system. For electronic output, such as a file written to a disk, the printing system would comprise the facility of the control system to write the data in a given format to a disk. The rendering would be the formatting of the data in accordance with that protocol, such a *.jpg, *.tif, *.bmp files.

The nature or contents of the input image, either from the scanner or the camera, could be used to determine the nature of the output document. If the input image is from a camera, for example, the file would default to a JPEG (*.jpg) file format. In addition, the contents of a document could indicate the results of an output document. A scanned document may have as part of its content a blank spot of a predetermined color. The MFP would automatically insert the captured input from a camera into that blank spot.

A further example of this type of processing could use a color that does not otherwise appear in the scanned image, for instance dark green. Image processing of the scanned image could detect the boundary and interior of this region. The captured image from the camera could then be superimposed into this dark green region. More than one region could be used, for example, a second region of orange could be designated in the scanned image. A first capture could go into the dark green region and a second capture could go into the orange region. The input image with the color regions could also be stored images, such as predefined backgrounds, rather than scanned in by the user.

As mentioned before, the assumption of the multi-function peripheral as a copier was for purposes of discussion only. The MFP could be a network printer that can send and receive electronic files with no need for a disk drive. Any of the previously mentioned functions can be incorporated into the MFP.

Thus, although there has been described to this point a particular embodiment for a method and structure for a multi-function peripheral including a camera it is not intended that such specific references be considered as limitations upon the scope of this invention except in-so-far as set forth in the following claims.

What is claimed is:

1. A copier for producing output images comprising:
   a scanning system adapted to create at least one scanned image;
   a camera, attached to a chassis of the copier, adapted to capture at least one captured still image and the camera adapted to be adjustably positioned to capture the at least one captured image;
   a copier controller adapted to receive:
      the at least one scanned image and
      the at least one captured still image
   and adapted to render an output image based on at least a portion of the at least one scanned input image and at least a portion of the at least one captured still image;
   a printing system adapted to produce the output image rendered by the controller; and
   a rotating table adapted to receive one or more objects adapted to be captured by the camera, the rotating table proximate to where the camera is attached to the copier so as to enable the camera to capture the one or more objects received by the rotating table.

2. The copier of claim 1 wherein the copier further comprises
   a preview panel adapted to preview the output image.

3. The copier of claim 1 wherein the camera is adapted to capture a plurality of images of the one or more objects received by the rotating table.

4. The copier of claim 1 further comprising
   a background adapted to be positioned proximate to the rotating table.

5. The copier of claim 1 further comprising:
   a storage operable to store any of the following:
      the at least one scanned input image;
      the at least one captured still image; and
      one or more pre-stored inputs.

6. A copier for producing output images comprising:
   a scanning system adapted to create at least one scanned image;
   a camera, attached to a chassis of the copier, adapted to capture at least one captured still image and the camera adapted to be adjustable positioned to capture the at least one captured image;
   a copier controller adapted to receive:
      the at least one scanned image and
      the at least one captured still image
   and adapted to render an output image;
   a printing system adapted to produce the output image rendered by the controller; and a rotating table adapted to receive one or more objects adapted to be captured by the camera, the rotating table proximate to where the camera is attached to the copier so as to enable the camera to capture the one or more objects received by the rotating table; wherein the copier controller is adapted to merge
   at least a portion of the at least one scanned input image and
   at least a portion of the at least one captured still image.

7. The copier of claim 6 wherein the printing system is further adapted to produce an output image based on the one or more merged documents.

8. A copier for producing output images comprising:
   a scanning system adapted to create at least one scanned image;
   a camera, attached to a chassis of the copier, adapted to capture at least one captured still image and the camera adapted to be adjustably positioned to capture the at least one captured image;
   a copier controller adapted to receive:
      the at least one scanned image and
      the at least one captured still image
   and adapted to render an output image;
   a printing system adapted to produce the output image rendered by the controller; and
   a rotating table adapted to receive one or more objects adapted to be captured by the camera, the rotating table proximate to where the camera is attached to the copier so as to enable the camera to capture the one or more objects received by the rotating table;
   wherein the camera is adapted to capture a plurality of images of the one or more objects received by the rotating table; and
   wherein the copier controller is further adapted to render the output image based on the captured plurality of images to generate a two-dimensional representation of a 360 degree view of at least one object of the one or more objects received by the rotating table.

9. A copier for producing output images comprising:
   a scanning system adapted to create at least one scanned image;
   a camera, attached to a chassis of the copier, adapted to capture at least one captured still image and the camera adapted to be adjustably positioned to capture the at least one captured image;
   a controller adapted to receive any of the following:
      the at least one scanned image; and
      the at least one captured still image;
   and adapted to render an output image;
   a printing system adapted to produce the output image rendered by the controller;
   a rotating table adapted to receive one or more objects adapted to be captured by the camera, the rotating table proximate to where the camera is attached to the copier so as to enable the camera to capture the one or more objects received by the rotating table; and
   a background adapted to be positioned proximate to the rotating table
   wherein the background is a pull-up background.

10. The copier of claim 9 wherein the pull-up background is attached to the copier.

11. The copier of claim 9 wherein the camera is adapted to be adjustably positioned, to capture the at least one captured still image, at a direction directed to the pull-up background.

12. The copier of claim 1 wherein the camera is adapted to be adjustably positioned to capture the at least one captured still image from an overhead position.

13. The copier of claim 1 wherein the camera is adapted to be adjustably positioned at a plurality of directions.

14. A copier for producing output images comprising:
   a scanning system adapted to create at least one scanned image;
   a camera, attached to a chassis of the copier, adapted to capture at least one captured still image and the camera adapted to be adjustably positioned to capture the at least one captured image;
   a controller adapted to receive any of the following:
      the at least one scanned image; and
      the at least one captured still image;
   and adapted to render an output image;

a printing system adapted to produce the output image rendered by the controller; and a pull-up background attached to the copier.

15. The copier of claim 14 further comprising:

a platen cover on top of the chassis.

16. The copier of claim 14 wherein the chassis is an enclosed casing.

17. The copier of claim 1 further comprising:

a platen cover on top of the chassis.

18. The copier of claim 17 wherein the rotating table is on top of the platen cover.

19. The copier of claim 1 wherein the chassis is an enclosed casing.

20. A multi-function peripheral (MFP) device for producing output images comprising:

a scanning system adapted to create at least one scanned image;

a camera, attached to a chassis of the MFP, adapted to capture at least one captured still image and the camera adapted to be adjustably positioned to capture the at least one captured image;

a controller adapted to receive
the at least one scanned image and
the at least one captured still image
and adapted to render an output image based on at least a portion of the at least one scanned input image and at least a portion of the at least one captured still image;

a printing system adapted to produce the output image rendered by the controller;

a rotating table adapted to receive one or more objects adapted to be captured by the camera, the rotating table proximate to where the camera is attached to the MFP so as to enable the camera to capture the one or more objects received by the rotating table; and a platen cover attached to the MFP.

* * * * *